United States Patent
Thimmel et al.

(10) Patent No.: US 8,453,831 B1
(45) Date of Patent: Jun. 4, 2013

(54) CONVEYOR ROLLER USING EXPANDABLE FOAM

(75) Inventors: Frederick H. Thimmel, Hartland, WI (US); Jeff Steiner, Menomonee Falls, WI (US); Todd Brennecke, Watertown, WI (US)

(73) Assignee: Bryant Products Inc., Ixonia, WI (US)

( * ) Notice: Subject to any disclaimer, the term of this patent is extended or adjusted under 35 U.S.C. 154(b) by 169 days.

(21) Appl. No.: 12/839,644

(22) Filed: Jul. 20, 2010

Related U.S. Application Data

(60) Provisional application No. 61/228,185, filed on Jul. 24, 2009.

(51) Int. Cl.
*B65G 39/00* (2006.01)

(52) U.S. Cl.
USPC ............................................. 198/842; 492/53

(58) Field of Classification Search
USPC .............. 198/842; 193/37; 492/45, 49, 53–56
See application file for complete search history.

(56) References Cited

U.S. PATENT DOCUMENTS

| | | | | |
|---|---|---|---|---|
| 3,866,572 A | * | 2/1975 | Gundlach | 399/313 |
| 4,186,162 A | * | 1/1980 | Daley | 264/46.5 |
| 4,440,295 A | * | 4/1984 | Blackwood-Murray et al. | 198/843 |
| 4,583,272 A | * | 4/1986 | Keller | 492/53 |
| 5,381,887 A | * | 1/1995 | Emmons | 198/830 |
| 5,415,612 A | * | 5/1995 | Carlson et al. | 492/56 |
| 5,468,531 A | * | 11/1995 | Kikukawa et al. | 428/36.5 |
| 5,493,777 A | * | 2/1996 | Burke | 29/895.32 |
| 5,893,210 A | * | 4/1999 | Takei et al. | 29/895.32 |
| 6,640,711 B2 | * | 11/2003 | Smoot et al. | 101/375 |
| 6,939,279 B2 | * | 9/2005 | Shea et al. | 492/56 |
| 2007/0111874 A1 | * | 5/2007 | Sugimura et al. | 492/59 |
| 2008/0146427 A1 | * | 6/2008 | Osaku | 492/56 |

OTHER PUBLICATIONS

American Roller Company website (http://www.americanroller.com/news/news.asp?is=31), Mar. 31, 2010.
Ralphs-Pugh website (http://www.ralphs-pugh/plastic_rollers/index.html), May 26, 2010.

* cited by examiner

*Primary Examiner* — Mark A Deuble
(74) *Attorney, Agent, or Firm* — Craig A. Fieschko, Esq.; DeWitt Ross & Stevens S.C.

(57) ABSTRACT

A roller includes an inner core assembly surrounded by a rigid expanded foam roller body, preferably having closed-cell foam with a density of 2 pcf or denser. The foam roller body may be formed by injecting or pouring expandable foam into a mold, or by spraying expandable foam over the inner core assembly, allowing it to cure, and machining it to desired specifications. The use of expanded foam cuts the costs of raw materials, production, labor, etc. To provide abrasion resistance and/or traction, a protective outer layer is provided over the foam roller body, preferably having a thickness of 0.5 inches or less, and a run-out of 0.1 inches or less. The outer layer helps make the foam roller body strong and durable enough for conveyor, pulley, and other industrial applications.

20 Claims, 3 Drawing Sheets

CONVEYOR ROLLER USING EXPANDABLE FOAM

CROSS-REFERENCE TO RELATED APPLICATIONS

This application claims priority under 35 USC §119(e) to U.S. Provisional Patent Application 61/228,185 filed Jul. 24, 2009, the entirety of which is incorporated by reference herein.

FIELD OF THE INVENTION

This document concerns an invention relating generally to rollers formed of rigid expanded foam for conveyor and pulley systems.

BACKGROUND OF THE INVENTION

Conveyor rollers are generally manufactured by forming or machining a drum (often hollow) from tubing, pipe, or other similar solid material. Typical designs for conveyor rollers include a metal shaft with a roller body made of metal tubing or pipe, with end disks added to "plug" the ends of the roller body. Plastic conveyor rollers are also known, wherein dense/solid plastic is cast or otherwise formed about a shaft to define the roller body. Such plastic rollers may include "torque coupling" structure protruding from the shaft into the plastic roller body to promote adhesion between the shaft and the roller body. As an example, the Ralphs-Pugh Co. (Benicia, Calif.) produces tapered conveyor rollers having urethane roller bodies, with the roller bodies somewhat resembling hard rubber. Ralphs-Pugh also makes tapered rollers of compressible foam, wherein the foam roller bodies are preformed and fit over a shaft (or a smaller-diameter roller). Such compressible rollers are often used on roller conveyors wherein products ride directly on the rollers (with the "soft" rollers avoiding damage to the products), and are also often used as "pinch rollers" wherein opposing rollers sandwich and compress matter (e.g., a paper web).

Conventional rollers tend to be costly, in part due to the material and manufacturing costs of the roller components (drum, end disks, etc.) and the need to assemble these with some degree of precision (to avoid eccentricity/rotational imbalance, surface defects which may damage belts or other matter carried on drum surfaces, etc.). Further, typical rollers have high mass and inertia, and less than ideal dynamic properties.

Thus, a long-felt need exists for conveyor rollers which are more quickly, easily, and economically manufactured, and which have lower weight and better dynamic properties.

SUMMARY OF THE INVENTION

The invention, which is defined by the claims set forth at the end of this document, is directed to a roller made with expandable foam which at least partially alleviates the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

An exemplary conveyor roller 10 (see FIG. 8) includes a core assembly 12 (see FIG. 1), the outer surface of which is circumferentially surrounded by a porous rigid expanded foam roller body 14 (see FIG. 7). An outer "lagging" layer 16 (see FIG. 8), which is preferably made of a different material from the foam roller body 14 (most preferably a high-friction material), may be circumferentially provided about at least a portion of the outer surface of the foam roller body 14 shown in FIG. 7. By using rigid expandable foam to make the foam roller body 14, the roller 10 (or at least a portion thereof) is made lighter and less expensive. Rollers 10 of this nature may be used in, for example, conveyor or pulley systems.

The expanded foam is preferably closed-cell foam, i.e., foam having entrapped closed gas pockets. However, open-cell foam (i.e., foam having networks of air passages, as in a sponge) may be used instead. The foam roller body 14 preferably has a density greater than or equal to 2 pounds per cubic foot ("pcf"), but the density may range from 1 pcf to 10 pcf or higher. A density in the range of 3-5 pcf is generally suitable for most applications. Examples of materials that may be used in the foam roller body 14 include expanded urethane foam and/or expanded neoprene foam.

To enhance the strength and wear resistance of the foam roller body 14, the outer layer 16 of the roller 10 preferably provides abrasion resistance and/or traction, and serves as a protective buffer against objects that come in contact with the roller 10 (as by helping to prevent denting or gouging of the foam roller body 14). The outer layer 16 may include urethane, rubber and its derivatives (such as neoprene and silicone), or another suitable material, and may be provided with any thickness deemed appropriate for an application. For many applications, an outer layer 16 having a thickness less than or equal to 0.5 inches is suitable.

As shown in FIG. 8, the roller 10 has lateral faces 18 at its opposing roller axial ends 22 and 24. To help protect the lateral faces 18 and 20 of the roller 10 (and in particular, any exposed portions of the foam roller body 14), the roller 10 may be provided with lateral covers covering the lateral faces 18 and 20. The lateral covers, which may be formed of coatings and/or disk-like/annular end caps, are preferable if exposed axial ends of the foam roller body 14 would make the foam roller body 14 more susceptible to damage.

As shown in FIG. 2, to enhance adhesion between the inner core assembly 12 and the foam roller body 14, and reduce the possibility that the foam roller body 14 shears free of the core assembly 12, the roller 10 preferably includes a torque coupler 30 extending radially outwardly from the core assembly 12 into the foam roller body 14. The torque coupler 30 may be a flange or any protrusion, extension, or addition to the core assembly 12 that extends into the foam roller body 14 and serves as a "skeleton" which assists in supporting the foam roller body 14.

An exemplary method for making the roller 10 of FIG. 8 is schematically illustrated in step-by-step fashion in FIGS. 1-8, and begins with the core assembly 12 shown in FIG. 1. The torque couplers 30 are affixed or otherwise provided about the core assembly 12 (see FIG. 2), and the core assembly 12 is inserted between sections of a mold 100 (FIG. 3). The mold sections 100 are closed about the core assembly 12, and expandable foam is injected into the mold 100 to circumferentially surround the outer surface of the core assembly 12 with expandable foam (see FIG. 4). The expandable foam is then allowed to expand into a porous rigid expanded foam roller body 14 (see FIG. 5) such that the foam roller body 14 has the desired density. If the foam roller body 14, once rigid, does not have the desired dimensions and/or shape, it may be milled or otherwise machined (as by use of a lathe) to have the desired outer circumferential dimensions (FIG. 6). The outer layer 16 may then be sprayed, molded, or otherwise formed about the outer surface of the foam roller body 14 (FIG. 7).

The roller 10 of FIG. 8 may be combined with a belt in a conveyor or pulley system, with the outer surface of the roller 10 being at least partially wrapped by the belt. The roller 10 then rotates in the conveyor or pulley system with the belt traveling tangentially with the outer surface of the roller 10. Objects may then be transported on the roller(s) 10 and belt to convey them to different locations.

The roller 10 with the foam roller body 14 can provide advantages over conventional rollers: because the roller 10 is lighter, it requires less energy (and thus less cost) to drive in a conveyor or pulley system; it can have dynamic properties different from conventional metal rollers 10, which can be useful in a variety of applications; it reduces the wear on the drive mechanisms and devices (such as bearings) in a conveyor or pulley system; and it costs less to ship. Production costs can be reduced owing to the relatively low expense of the materials used to produce the foam, and the ease by which the foam roller body 14 is molded, machined, and/or otherwise formed into its final desired shape. Moreover, the foam roller body 14 can dampen the noise and vibration that may otherwise be transmitted through a conventional system. Additionally, the materials with which the roller 10 is made resist corrosion.

Additional advantages and features of the invention will be apparent from the remainder of this document in conjunction with the associated drawings.

BRIEF DESCRIPTION OF THE DRAWINGS

FIGS. 1-8 provide a schematic illustration of an exemplary method for producing a roller 10 as depicted in FIG. 8, wherein:

FIG. 1 shows a perspective view of an exemplary core assembly 12;

FIG. 2 shows the core assembly 12 after the addition of exemplary torque couplers 30;

FIG. 3 shows the core assembly 12 of FIG. 2 being situated within sections of a mold 100;

FIG. 4 shows the mold sections 100 closed about the core assembly 12, with injection equipment 104 providing expandable foam (or the components thereof) to the mold 100 via an injection aperture 106;

FIG. 5 shows the resulting foam roller body 14 after removal from the mold 100;

FIG. 6 shows the foam roller body 14 of FIG. 5 being machined (as by a lathe) into the desired shape and/or dimensions;

FIG. 7 shows the application of an outer layer to the machined foam roller body of FIG. 6 by use of a sprayer 108; and FIG. 8 shows a resulting exemplary roller 10.

DETAILED DESCRIPTION OF PREFERRED VERSIONS OF THE INVENTION

Continuing the discussion in the foregoing Summary of the Invention section, the core assembly 12 may be formed of metals and metal alloys (e.g., aluminum or steel), polymers, composites, or other materials as appropriate for the application. In addition to the materials already listed, the outer layer 16 provided on the foam roller body 14 may be formed of any plastic, metal, ceramic, or other material which can be coated on, slipped about, or otherwise adhered to the outer circumference of the roller 10. The foam roller body 14, which tends to be a major factor affecting the cost and weight of the roller 10, may be formed of any porous foam which solidifies into an at least substantially rigid state.

Figure 1:
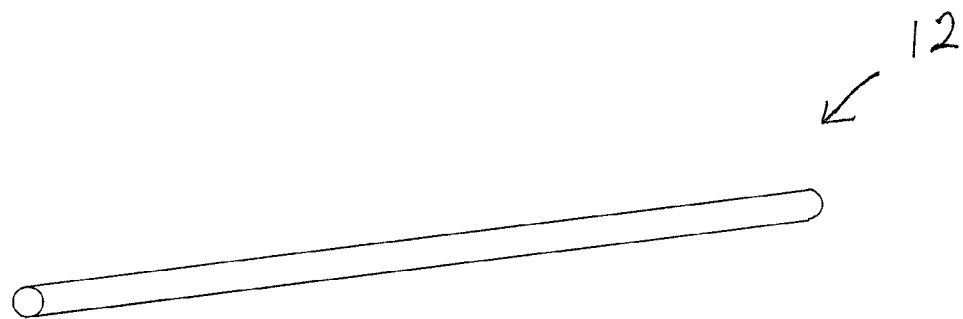
Figure 5:
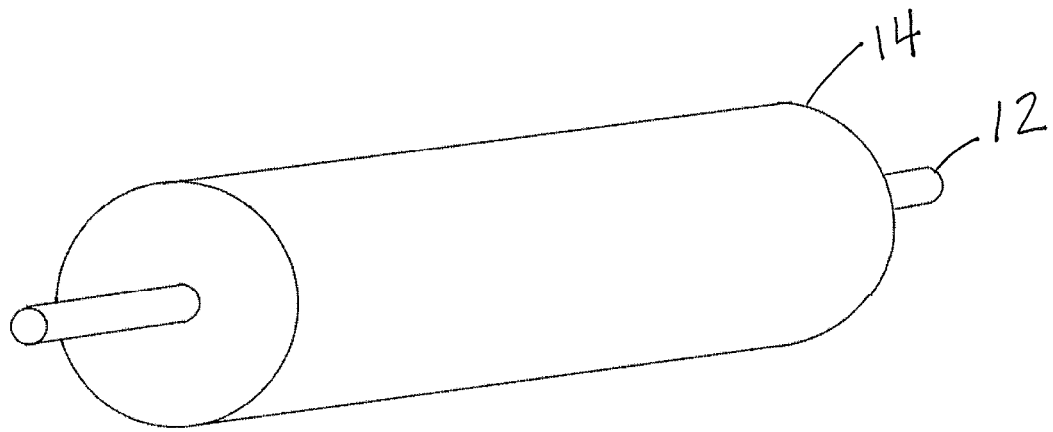

An exemplary method of making the roller 10 may begin with a core assembly 12 that is solid, hollow, or a combination of the two, as depicted in FIG. 1. For example, the core assembly 12 may include a tubular core, a machined shaft, or a tubular core about a machined shaft. The core assembly 12 may be cut to the desired length, and machined (if needed) to the dimensions required for an intended application. As shown in FIG. 5, the length of the core assembly 12 is preferably greater than the length of the foam roller body 14 to be provided about the core assembly 12.

Figure 2:
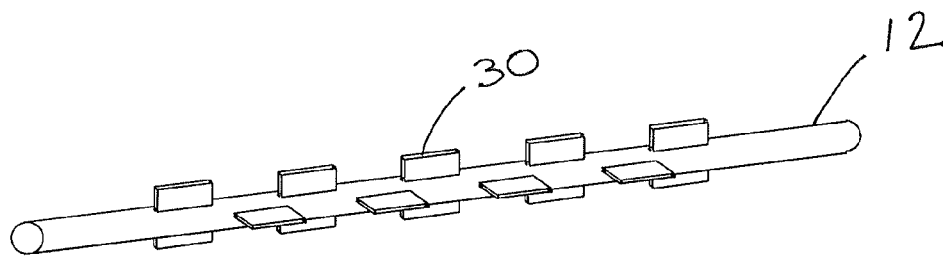
Figure 8:
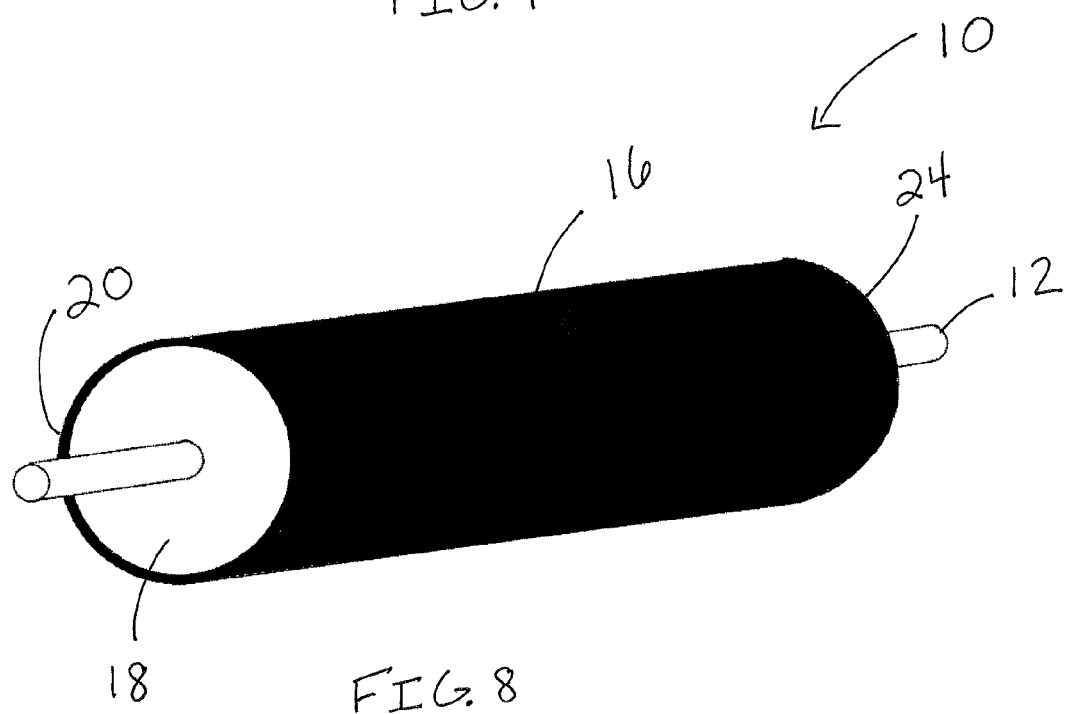

As shown in FIG. 2, if desired, a torque coupler 30 can then be added to the core assembly 12 (if one is not already affixed thereto) to secure the foam body material against spinning or breaking free from the core assembly 12 due to torque being applied to the roller 10 while in operation. While the torque coupler 30 can have any desired shape or dimension, it is preferably entirely embedded in the foam roller body 14 (FIG. 5), with at least some small spacing from the (desired) location of the outer circumference of the foam roller body 14. As examples, the torque coupler 30 may include one or more flanges/paddles, fingers, or any other structure that extends outwardly from the core assembly 12. The torque coupler 30 may be, for example, one or more metal plates or elongated strips. The torque coupler 30 can then be welded or otherwise affixed to the core assembly 12 such that it extends outwardly therefrom into the foam roller body 14 once the foam roller body 14 is formed about the core assembly 12. The torque coupler 30 thereby transmits torque from the core assembly 12 to the foam roller body 14, and eventually to the outer layer 16 (FIG. 8) of the roller 10.

Figure 3:
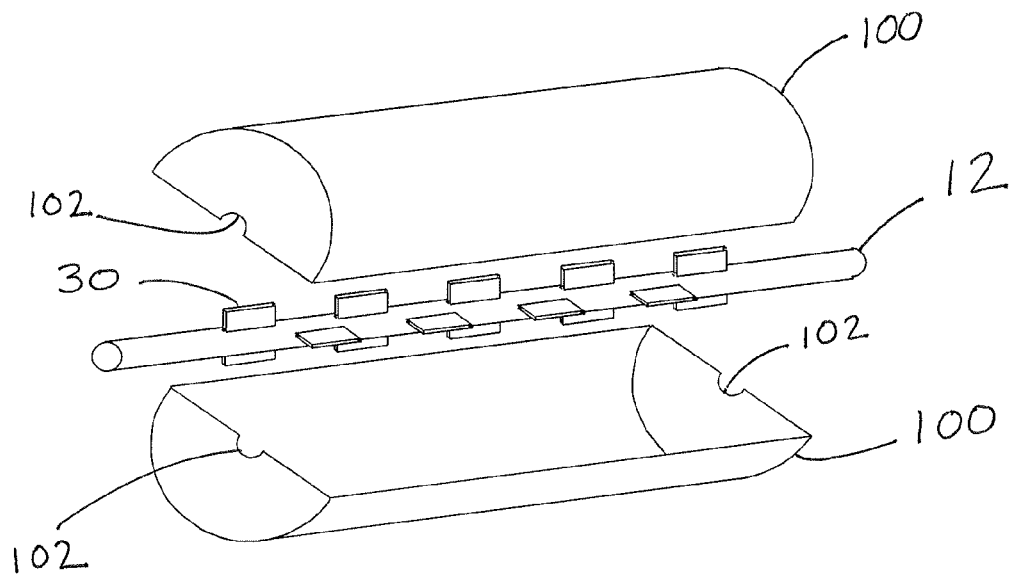

As shown in FIG. 3, a hollow mold 100 or sleeve may then be used to form the foam roller body 14 about the core assembly 12. The mold 100 preferably has a shape that corresponds with the desired shape of the foam roller body 14, for example, a cylindrical, crowned, or tapered mold 100. However, the shape of the mold 100 need not correspond to the shape of the desired roller 10, as the roller 10 may be machined or otherwise tooled to obtain the desired final shape.

Figure 4:
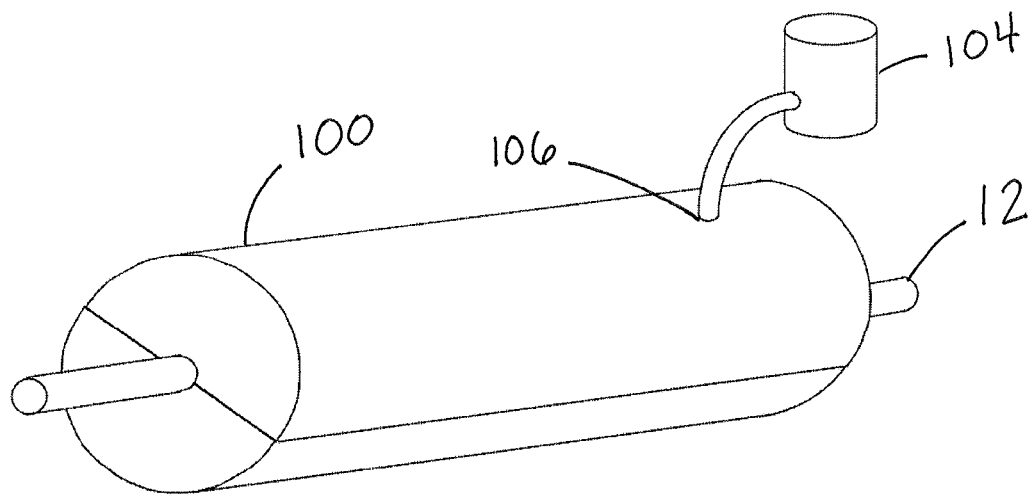

If a mold 100 is used, the mold 100 may first be opened and the inside surface thereof coated with a mold release agent so that expandable foam injected or otherwise provided therein does not adhere to the inside surface of the mold 100. The mold 100 may include apertures to allow escape of air during foam injection/expansion. The core assembly 12 (with any torque coupler 30 thereon) may then be inserted into the mold 100, and the mold 100 closed about the core assembly 12 as shown in FIG. 4. The outer radii of the torque coupler 30 may rest against the inner surface of the mold 100 such that the axis of the core assembly 12 remains aligned with the axis of the mold cavity (that is, so that the core assembly 12 is at least roughly centered in the mold cavity). Alternatively, the core assembly 12 and the axis of the mold 100 may be aligned by having the core assembly 12 extend through one or more mold openings 102 on opposing ends of the mold 100.

Several methods may be used to form the foam roller body 14 about the core assembly 12. For example, the foam mixture may be applied directly over the core assembly 12 by using injection equipment 104 (FIG. 4), which can mix any foam components (if needed) and then spray or extrude the components into the mold 100 and about the core assembly 12. The foam may alternatively be sprayed onto the core assembly 12 to form the foam mass, which (after solidification) may then be machined into the desired final shape.

Alternatively, the expandable foam may be provided in the form of sleeves or sections which can be situated about over the core assembly 12 and secured with an adhesive, and/or by an outer coating.

When using the mold 100 as in FIGS. 3-4, expandable foam may be poured, injected, or otherwise added between the mold 100 and the core assembly 12 so that the foam expands to fill the volume between the inner surface of the mold 100 and the outer surface of the core assembly 12 (with any torque coupler 30 attached thereto). The expandable foam is preferably added to the mold 100 through an injection aperture 106 (FIG. 4) in one of the walls of the mold 100. In general, the quantity of expandable foam added is directly proportional to the desired density of the foam roller body 14. In general, the more expandable foam added to the mold 100, the denser the resulting foam roller body 14.

After the expandable foam has been added to the mold 100, the foam is allowed to cure and become rigid. The time required for the expandable foam to cure depends on such factors as the composition, temperature, exposure to the atmosphere, and quantity of the expandable foam added to the mold 100, and may be as short as a few seconds to hours or longer. Preferably, however, the expandable foam is selected so as to expand immediately and harden in seconds, reducing manufacturing time. The rigidity and overall strength of the expanded foam roller body 14 depends in large part on the formulation of the expandable foam used.

Figure 6:
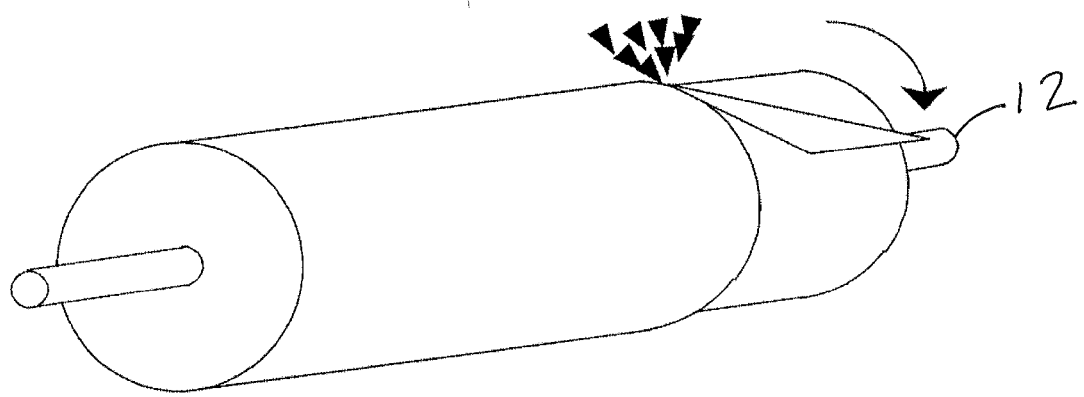

Once the expandable foam has been cured, the mold 100 may be disassembled and the core assembly 12 (surrounded by the expanded foam) removed therefrom, resulting in a roller as shown in FIG. 5. The outer surface of the expanded foam may be machined or otherwise trimmed to remove any mold release agent residues that remain on the expanded foam, and/or to have the foam roller body 14 assume a desired final shape. To illustrate, as shown in FIG. 6, the foam-encapsulated core assembly 12 can be placed in a lathe and machined into a particular shape, dimension, or configuration appropriate for an intended application.

Figure 7:
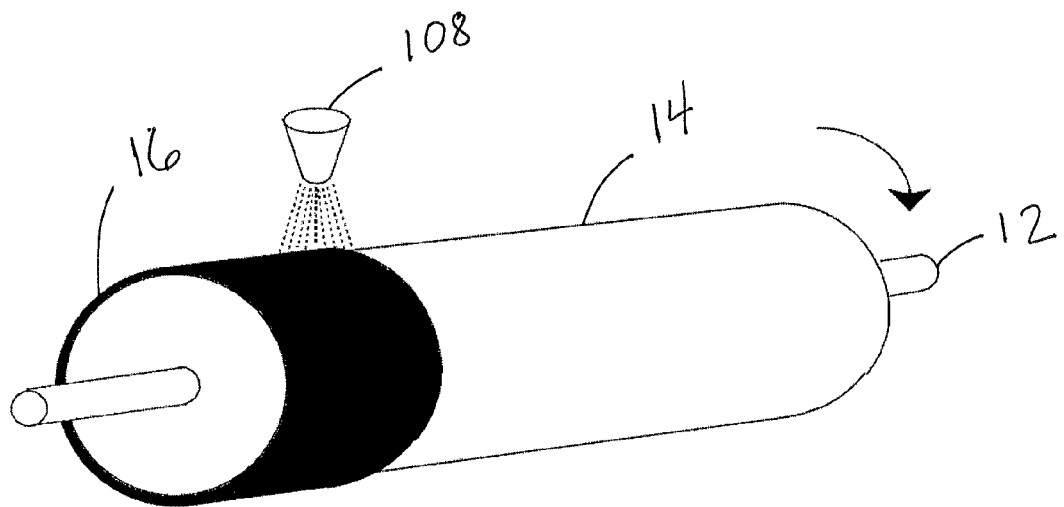

To provide the foam roller body 14 with the durability needed to run belts and parts over its outer circumference without unduly wearing or chipping the foam roller body 14, one or more outer layers 16 may be added to the outer circumference of the foam roller body 14 (see FIG. 7). The outer layer 16 may be a thin layer of material such as urethane, rubber, neoprene, or a mixture thereof. A Computer Numerically Controlled ("CNC") sprayer/lagging machine 108, for example, may be used to apply an outer layer 16. The outer layer 16 may be applied in a circular/helical pattern as the roller 10 is rotated, covering and bonding with the foam roller body 14's outer surface.

Other methods for forming the outer layer 16 are also available in addition to (or instead of) the foregoing methods. For example, the material of the outer layer 16 may be molded pre-mixed urethane or other material that is injected or molded over the outer surface of the foam roller body 14, covering the face and, if necessary, the ends of the roller 10. As another example, the coating material may be a sleeve made of rubber, urethane, metals, plastics, or other materials that slides or is urged into place about the roller body 14 and secured by various mechanical and chemical means. Additionally, the outer layer 16 can be a vulcanized rubber, neoprene, or other material that is applied over the foam roller body 14 and cured into place chemically and/or thermally.

The foam used in the foam roller body 14 and the materials used in the outer layer 16 may be of similar chemical structure with similar bond strength. A strong interlayer bond between the foam roller body 14 and the outer layer 16 is desirable to achieve good peel strength, proper material adhesion, and resistance to abrasion. A coating, for example, may provide the roller 10 with the durability of steel. Further, the durability, abrasion resistance, and NVH (Noise, Vibration, and Harshness) of the foam roller 10 may be improved in comparison to typical steel rollers 10.

After application, the outer layer 16 is left to cure if necessary for a period of time, which can range from a few minutes to a day or more depending on the material used. The outer layer 16 may then be machine-finished to provide it with the required profile and the desired thickness and run-out specifications (run-out being a measure of imperfections in the layer). For example, a thickness of 0.5 inches or less and a run-out of less than 0.1 inches are suitable for many applications, depending in part on the tolerances required for the system in which the roller 10 is to be used.

In addition to (or instead of) applying the material used in the outer layer 16 to the lateral ends 18 and 20 of the foam roller body 14, the roller 10 may be equipped with covers (for example, washer-like plates or caps) on the lateral ends 18 and 20 to further protect the foam roller body 14. The covers may be made from metal, plastic, cardboard, or any suitable material or coating.

Layers may be added to and taken away from the outer surface of the roller body 14 as desired to obtain the combination of layers desired. For example, an additional layer of foam may be molded, sprayed, or otherwise added over the outer layer 16, and the additional foam layer may be provided with an additional high-friction outer layer 16. The number, configuration, widths, and thickness of the parts of the roller 10 may be adjusted as deemed appropriate for an application.

Rollers 10 in accordance with the invention may be employed in a variety of applications in addition to conveyor systems, such as pulley systems and other applications where straight, crowned, grooved, tapered, or other rollers are used. The roller 10 may be suitable, for example, for web feed and guide rolls for use in paper, packaging, converting, and wrapping industries. Further, the roller 10 may be suitable for use in printing or other systems.

Various preferred versions of the invention are shown and described above to illustrate different possible features of the invention and the varying ways in which these features may be combined. Apart from combining the different features of the foregoing versions in varying ways, other modifications are also considered to be within the scope of the invention. The invention is not intended to be limited to the preferred versions of the invention described above, but rather is intended to be limited only by the claims set out below. Thus, the invention encompasses all different versions that fall literally or equivalently within the scope of these claims.

What is claimed is:
1. A roller for a conveyor system,
  a) the roller including:
    1) an inner core assembly rotatable about an inner core central axis, the inner core assembly having an inner core thickness;
    2) a porous rigid expanded foam roller body circumferentially surrounding the outer surface of the inner core assembly;
    3) an outer layer circumferentially provided about at least a portion of the outer surface of the foam roller body, the outer layer being made of a different material than the foam roller body; and
    4) a rigid torque coupler extending radially outwardly a coupler distance from the inner core central axis, wherein:

(i) the torque coupler is at least partially embedded within the foam roller body; and
(ii) the coupler distance is at least half as great as the inner core thickness;
b) whereby when the inner core assembly is rotated about the inner core central axis in a driven conveyor system, the torque coupler transmits torque experienced by the inner core assembly to the foam roller body such that the foam roller body rotates with the inner core assembly.

2. The roller of claim 1, wherein:
a) the torque coupler includes a flange having a torque coupling flat surface with a coupling flat surface area;
b) the torque coupling flat surface is configured to substantially evenly distribute across the coupling flat surface area the torque transmitted from the inner core assembly to the foam roller body; and
c) the roller is configured such that the torque coupler does not substantially tunnel through the foam roller body when the inner core assembly is driven in a conveyor system.

3. The roller of claim 1, wherein the torque coupler is at least substantially completely embedded in the foam roller body.

4. The roller of claim 1, wherein the foam roller body has a density that is greater than or equal to two pounds per cubic foot.

5. The roller of claim 1, wherein the foam roller body includes at least one of:
a) expanded urethane foam, or
b) expanded neoprene foam.

6. The roller of claim 1, wherein the outer layer includes at least one of:
a) urethane,
b) rubber, or
c) neoprene.

7. The roller of claim 1, wherein the thickness of the outer layer is less than or equal to 0.5 inches.

8. The roller of claim 1, wherein the roller further includes:
a) a roller first axial end and an opposing roller second axial end,
b) a first lateral face at the roller first axial end and a second lateral face at the roller second axial end, and
c) a first lateral cover covering the first lateral face and a second lateral cover covering the second lateral face.

9. The roller of claim 1 in combination with a tensioned belt in a driven conveyor system, wherein:
a) the outer surface of the roller is at least partially wrapped by the belt; and
b) rotation of the inner core assembly is powered by the driven conveyor system.

10. The roller of claim 1 wherein:
a) the inner core assembly includes an elongated rod having a rod diameter;
b) the coupler distance is at least as great as the rod diameter.

11. The roller of claim 1 wherein the torque coupler includes a blade:
a) extending substantially perpendicularly from an outer surface of the inner core assembly;
b) having a blade first face opposing a blade second face, each of the blade first and second faces being at least substantially planar; and
c) configured such that one of the blade first face and the blade second phase presses against the foam roller body when the inner core assembly rotates about the inner core central axis.

12. The roller of claim 1 wherein:
a) the torque coupler includes a blade having a planar blade face;
b) the blade extends outwardly from the inner core assembly in a blade direction, the blade direction being at least substantially perpendicular to the inner core central axis; and
b) when the inner core assembly is rotating in a first direction, the planar blade face presses against the foam roller body in a force direction that is at least substantially perpendicular to:
1) the planar blade face; and
2) the blade direction.

13. A method for making a roller for a conveyor system, the method including:
a) circumferentially surrounding the outer surface of an inner core assembly with an expandable foam, the inner core assembly having a rigid torque coupler extending radially outwardly therefrom, wherein:
1) the torque coupler extends radially outwardly a coupler distance from an inner core central axis of the inner core assembly; and
2) the coupler distance is at least half as great as an inner core thickness of the inner core assembly;
b) allowing the expandable foam to expand into a porous rigid expanded foam roller body while the expandable foam is situated about the inner core assembly, wherein the expandable foam is allowed to expand to a rigid expanded foam roller body that at least substantially envelops:
1) the inner core assembly; and
2) the torque coupler; and
c) providing an outer layer circumferentially about at least a portion of the outer surface of the foam roller body, the outer layer being made of a different material than the foam roller body.

14. The method of claim 13, wherein the expandable foam expands into the foam roller body having a density that is greater than or equal to two pounds per cubic foot.

15. The method of claim 13, wherein the outer layer is provided a thickness of less than or equal to 0.5 inches.

16. The method of claim 13, wherein:
a) the roller includes a first lateral face at a roller first axial end and a second lateral face at a roller second axial end, the roller second axial end opposing the roller first axial end, and
b) the method further includes:
1) covering the first lateral face with a first lateral cover; and
2) covering the second lateral face with a second lateral cover.

17. The method of claim 13, wherein:
a) the expandable foam with which the outer layer of the inner core assembly is circumferentially surrounded includes at least one of:
1) urethane foam, or
2) neoprene foam, and
b) the outer layer provided circumferentially about at least a portion of the outer surface of the foam roller body includes at least one of:
1) urethane,
2) rubber, or
3) neoprene.

18. The method of claim 13 further including the steps of:
1) using the roller in combination with a tensioned belt in a driven conveyor system such that the outer surface of the roller is at least partially wrapped by the belt; and
2) powering rotation of the inner core assembly of the roller.

19. A method of using a roller in a conveyor system,
a) the roller having:
   1) an inner core assembly;
   2) a porous rigid expanded foam roller body circumferentially surrounding the outer surface of the inner core assembly;
   3) an outer layer circumferentially fit about at least a portion of the outer surface of the foam roller body, the outer layer being made of a different material than the foam roller body; and
   4) a torque coupler extending radially outwardly from the inner core assembly, the torque coupler being at least partially embedded in the foam roller body;
b) the method including the step of driving rotation of the inner core assembly of the roller, the roller being at least partially wrapped by a tensioned belt, wherein:
   1) the foam roller body rotates with the inner core assembly as a result of torque transmission from the inner core assembly to the foam roller body via the torque coupler; and
   2) the belt rotates along an axis tangential with the outer surface of the roller.

20. The method of claim 19 further including the step of transporting an object on the belt from a first position to a second position along the axis tangential with the outer surface of the roller.

\* \* \* \* \*